United States Patent
Schreck et al.

(10) Patent No.: US 6,501,066 B1
(45) Date of Patent: Dec. 31, 2002

(54) SYSTEM FOR READING PHOTO-STIMULATED ACCUMULATIVE LUMINESCENT SUBSTANCES

(75) Inventors: Oliver Schreck, Bamberg (DE); Randolf Hanke, Fürth (DE)

(73) Assignee: Fraunhofer-Gesellschaft zur Förderung der Angewandten Forschung, E.V., Munich (DE)

( * ) Notice: Subject to any disclaimer, the term of this patent is extended or adjusted under 35 U.S.C. 154(b) by 0 days.

(21) Appl. No.: 09/445,728
(22) PCT Filed: Jun. 3, 1998
(86) PCT No.: PCT/EP98/03313
§ 371 (c)(1), (2), (4) Date: Mar. 1, 2000
(87) PCT Pub. No.: WO98/57232
PCT Pub. Date: Dec. 17, 1998

(30) Foreign Application Priority Data

Jun. 9, 1997 (DE) .......................... 197 24 271

(51) Int. Cl.$^7$ ................................. G01J 1/04
(52) U.S. Cl. ................. 250/227.11; 250/484.4
(58) Field of Search .................. 250/227.14, 214.1, 250/227.11, 227.25, 458.1, 573, 330, 341.1, 341.6, 483.1, 484.4, 234; 422/82.05, 82.07, 82.08

(56) References Cited

U.S. PATENT DOCUMENTS

| | | | |
|---|---|---|---|
| 4,918,465 A | | 4/1990 | Morita |
| 5,266,803 A | * | 11/1993 | Heffelfinger ............... 250/582 |
| 5,557,452 A | | 9/1996 | Harris ....................... 359/368 |
| 5,606,170 A | * | 2/1997 | Saaski et al. ............. 250/458.1 |

FOREIGN PATENT DOCUMENTS

| | | |
|---|---|---|
| DE | 2363995 C2 | 7/1982 |
| DE | 33 32 909 A1 | 3/1985 |
| EP | 0 657 749 B1 | 6/1995 |
| JP | 61194970 | 8/1986 |
| JP | 1-185503 A | 7/1989 |
| JP | 3002746 | 1/1991 |

OTHER PUBLICATIONS

European Patent Application 0 559 118 A1, Date of Publication Sep. 8, 1993, Heffelfinger.

* cited by examiner

Primary Examiner—Frank G. Font
Assistant Examiner—Thanh X. Luu
(74) Attorney, Agent, or Firm—The Law Offices of Jessica J. Costa; Jessica Costa

(57) ABSTRACT

An arrangement for reading photo-stimulable storage luminescent substances comprises an excitation glass fiber into which light which excites the storage luminescent substance can be fed by means of a light source. Light emitted by the excited storage luminescent substance can be fed into a receiving glass fiber, an end of the excitation glass fiber which is positioned close to the storage luminescent substance being arranged next to an end of the receiving glass fiber which can be positioned close to the storage luminescent substance. The excitation glass fiber (12) has a first numerical aperture and the receiving glass fiber has a second numerical aperture which is large compared with the first numerical aperture, as a result of which the light fed out from the excitation glass fiber is directed straight onto the storage luminescent substance without an optical arrangement and the stimulated light can be captured by the receiving glass fiber without an optical arrangement. A glass fiber drum scanner uses the arrangement for reading photo-stimulable storage luminescent substances to achieve a two-dimensional readout of the storage luminescent substance by means of an advancing device which moves the one ends of the excitation glass fiber and the receiving glass fiber in one direction and by means of a rotary drum to which the storage luminescent substance is attached.

4 Claims, 3 Drawing Sheets

SYSTEM FOR READING PHOTO-STIMULATED ACCUMULATIVE LUMINESCENT SUBSTANCES

FIELD OF THE INVENTION

The present invention relates generally to optical scanners and in particular to a device for reading photo-stimulable storage luminescent substances.

BACKGROUND OF THE INVENTION AND PRIOR ART

The present invention uses the effect of photo-stimulated luminescence. Phosphorus is one example of the substances which display photoluminescence. A storage luminescent substance, e.g. one which contains phosphorus, absorbs radiation energy, which excites electrons into higher energy states. These higher energy states are unstable, so that the phosphor electrons fall back into a state with lower energy, the energy difference being emitted as light. The emitted light energy typically has a different wavelength than the radiation energy which has induced the photoluminescence.

In the field of dental medicine in particular, in which a plurality of X-ray pictures is created, there is a great need to replace the traditional X-ray pictures with new imaging techniques. It is time consuming and expensive to first expose and then develop X-ray films, the time needed for exposure and development being in general considerably greater than the time spent in actually looking at the X-ray picture in order to make a diagnostic decision. For this reason X-ray storage luminescent substance foils have recently been used instead of the traditional X-ray films, which have to be exposed and then developed, e.g. in the field of dental medicine. As has already been mentioned, such storage luminescent substance foils comprise an storage photoluminescent substance, e.g. phosphorus, which is capable of retaining a pattern over several days after it has been exposed. Multiple exposure and a higher dynamic range are also advantageous attributes. Image data obtained e.g. by exposure to radioactive substances can be recalled using light of the appropriate wavelength. In particular, light of the appropriate wavelength stimulates or excites photoluminescence in the storage luminescent substance, the light emitted by the excited storage luminescent substance typically having a different wavelength than that of the exciting light.

A glass fibre scanner for scanning an storage phosphor imaging plate is known from EP 0559118 A1. The glass fibre scanner comprises a forklike glass fibre bundle with emitter fibres and collecting fibres. In addition a device for focusing light into the near end of the emitter fibres is provided, while furthermore a device for focusing light from the far end of the emitter fibres onto the phosphor imaging plate and a device for collecting light at the far end of the collecting fibres are used to increase the sensitivity and wavelength resolution of the arrangement. Such a glass fibre cable is used in the x-y scanner to scan an storage phosphor imaging plate so as to transport light from a light source to the phosphors in the storage phosphor imaging plate and to collect phosphorescence induced by the light.

The glass fibre scanner for scanning an storage phosphor imaging plate according to EP 0559118 A1 requires a focusing/imaging lens, which is connected to the far ends of the at least one emitter fibre and the at least one collecting fibre. This focusing/imaging lens, which has to serve both to focus the exciting light and to collect the light created by photoluminescence, makes the whole arrangement more expensive, since it must not only be fabricated but it must also be positioned and adjusted.

JP-1-185503 discloses a photodetector with a light receiving surface which is contacted directly by a receiving glass fibre with a core and a sheath. The materials of the core and the sheath of the glass fibre are so chosen that the refractive indices of the same decrease at different rates as the wavelength increases, whereby the numerical aperture of the receiving glass fibre is wavelength dependent and decreases in the direction of increasing wavelength. As a result the receiving glass fibre provides relatively good transmission conditions for the light emitted by a phosphor layer whereas it provides relatively poor transmission conditions for the light for exciting the phosphor, this light having a longer wavelength than the phosphorescent light emitted by the phosphor layer, whereby the glass fibre acts roughly like a high-pass filter. Direct connection of the glass fibre with the light receiving surface of the photodetector is thus possible.

DE 2363995 C2 discloses a method for creating a radiographic picture and a device for performing this method. Through the agency of a radiation source light is here projected through an interference filter onto a region of an excitable medium, whereupon the excitable medium emits light radiation which is reflected at the interference filter and is projected through a lens onto an input area of an image intensifier tube.

U.S. Pat. No. 5,557,452 discloses a confocal microscope. Light radiated from one end of a glass fibre is here focused by a microscope objective and radiated through a window onto a sample to be investigated, the result being that the sample fluoresces. Part of the fluorescent light radiated by the sample passes through the window again and is fed into a glass fibre by the microscope objective to be processed further.

SUMMARY OF THE INVENTION

It is the object of the present invention to provide an arrangement for reading photo-stimulable storage luminescent substances and a glass fibre drum scanner which can be manufactured less expensively.

In accordance with a first object of the invention, this object is achieved by an arrangement for reading photo-stimulable storage luminscent substances comprising: an excitation glass fibre into which light which excites the storage luminscent substance can be fed by means of a light source; and a receiving glass fibre into which the light produced by an excited storage luminescent substance can be fed, wherin that end of the excitation glass fibre which is positionable so as to be close to the storage luminescent substance is arranged next to that end of the receiving glass fibre which is positionable so as to be close to the storage luminscent substance, wherein the excitation glass fibre has a first numerical aperture, and wherein the receiving glass fibre has a second numerical aperture which is large compared with the first numerical aperture, whereby the light which is fed out of the excitation glass fibre is directed straight onto the storage luminscent substance without an optical arrangement.

In accordance with a second aspect of the present invention, this object is achieved by a glass fibre drum scanner comprising: a glass fibre arrangement for reading photo-stimulable storage luminescent substances comprising an excitation glass fibre into which light which excites the storage luminescent substance can be fed by means of a light source; and a receiving glass fibre into which the light produced by an excited storage luminescent substance can be fed, wherein that end of the excitation glass fibre which is positionable so as to be close to the storage luminescent substance is arranged next to that end of the receiving glass fibre which is positionable so as to be close to the storage luminescent substance, wherein the excitation glass fibre has a first numerical aperture, and wherein the receiving glass fibre has a second numerical aperture which is large compared with the first numerical aperture, whereby the light which is fed out of the excitation glass fibre is directed straight onto the storage luminescent substance without an optical arrangement; and excitation light source whose light can be fed into another end of the excitation glass fibre; a receiver unit for receiving light transmitted in the receiving glass fibre; a drum unit rotatable about a first axis and to the curved surface of which the storage luminescent substance can be affixed; an advancing device for moving the closely arranged ends along the first axis; and a control unit for synchronizing operation of the excitation light source, the receiver unit, the drum unit and the advancing device.

The present invention is based on the finding that it is possible to achieve a more robust and more economical glass fibre drum scanner by dispensing with the optics for focusing the excitation light and for receiving the excited light so as to achieve a readout with high resolution and high contrast. The optics for focusing and for receiving the excited light can the more readily be dispensed with if a glass fibre with a small numerical aperture is used for the excitation glass fibre, whereas, by contrast, the receiving glass fibre must be a glass fibre with a large numerical aperture. The numerical aperture is known to specialists and is equal to the sine of half the solid angle of a maximum radiation cone which can be supplied by a glass fibre or which can be fed into a glass fibre. For a graded-index fibre e.g. the numerical aperture is calculated from the square root of the difference between the mean refractive indices of the glass fibre sheath and the glass fibre core. In accordance with the present invention the excitation fibre therefore consists of a glass fibre with a small numerical aperture, whereby the excitation light cone which it produces has a small solid angle, which means that, for a still moderate separation of the end of the excitation glass fibre which is positioned near the storage luminescent substance, a sufficient spot size is attainable, which in the final analysis defines the resolution with which the previously exposed storage luminescent substance foil can be read. By contrast, the receiving glass fibre, i.e. the glass fibre which collects the light emitted due to photoluminescence, must have a large numerical aperture, greater at least than the numerical aperture of the excitation glass fibre, in order that as much as possible of the light released due to photoluminescence can be collected. To increase the amount of photoluminescent light which is detected, and thus increase the sensitivity of a scanner, a multiplicity of receiving glass fibres may for preference be arranged around the excitation glass fibre, it being obvious to persons skilled in the art that the numerical aperture of a receiving glass fibre of the multiplicity of receiving glass fibres may then be smaller than the numerical aperture of a single receiving glass fibre while still achieving sufficient sensitivity of the storage luminescent substance scanner.

BRIEF DESCRIPTION OF THE DRAWINGS

Preferred embodiments of the present invention will be described in more detail below, making reference to the enclosed drawings in which.

DETAILED DESCRIPTION OF THE PRESENT INVENTION

Figure 1:
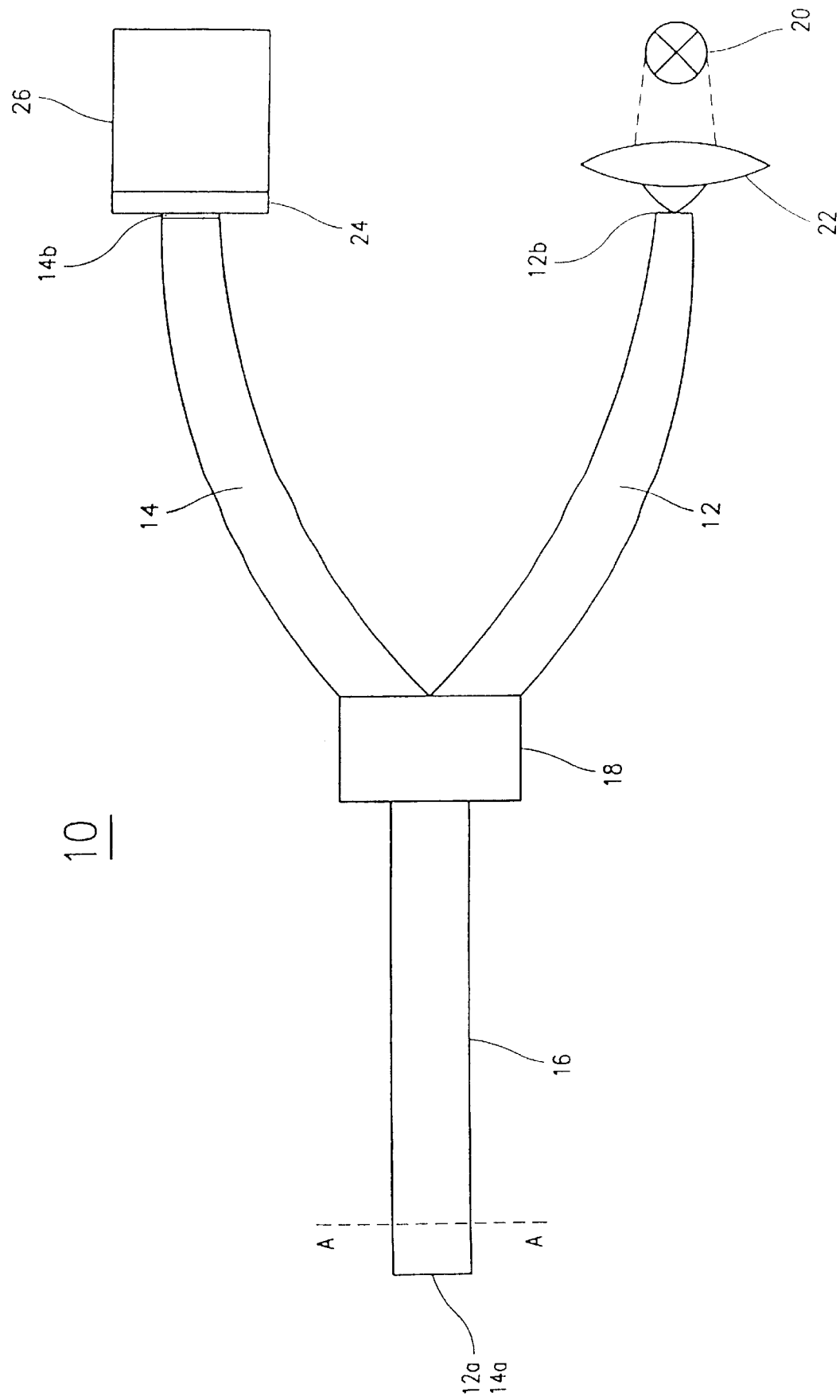
FIG. 1 shows an arrangement for reading photo-stimulable storage luminescent substances according to the present invention.

FIG. 1 shows an arrangement 10 for reading photo-stimulable storage luminescent substances according to the present invention. The arrangement 10 comprises an excitation glass fibre 12 and a receiving glass fibre 14, one end 12a and one end 14a being arranged in close proximity to each other in a region which can be positioned near a photo-stimulable storage luminescent substance. In the region of the one ends 12a and 14a the excitation glass fibre 12 and the receiving glass fibre 14 thus form a common bundle 16, which is split into the receiving glass fibre 14 and the excitation glass fibre 12 at a crossover section 18. The other end 12b of the excitation glass fibre is positioned near a light source 20 by means of which light can be fed into the excitation glass fibre 12, which has a small numerical aperture, via a suitable lens 22.

The other end 14b of the receiving glass fibre, which has a large numerical aperture compared with the numerical aperture of the excitation glass fibre 12, is coupled to an optical filter 24 for suppressing the excitation light, the output of the filter being connected effectively to an amplifier circuit 26. The numerical aperture of the excitation glass fibre 12 should lie in a range from 0.1 to 0.2 and preferably has a value of 0.12. On the other hand the numerical aperture of the receiving glass fibre 14 should lie in a range from 0.4 to 0.9 and preferably have a value of 0.5.

A monomode glass fibre is preferably used for the excitation glass fibre 12 to transmit light with a wavelength of 633 nm for a photo-stimulable X-ray storage luminescent substance BaFBr: $Eu^{2+}$, the monomode glass fibre here having a diameter of 3.7 $\mu$m. The excitation light from the light source 20 is fed into the monomode glass fibre by means of suitable optics, such as e.g. the lens system 22. The light source may e.g. be a laser or a halogen lamp. The intensity of this light can be varied. At the one end 12a of the excitation glass fibre 12 the excitation light emerges from the monomode fibre and excites the storage luminescent substance to photoluminescence.

Figure 2:
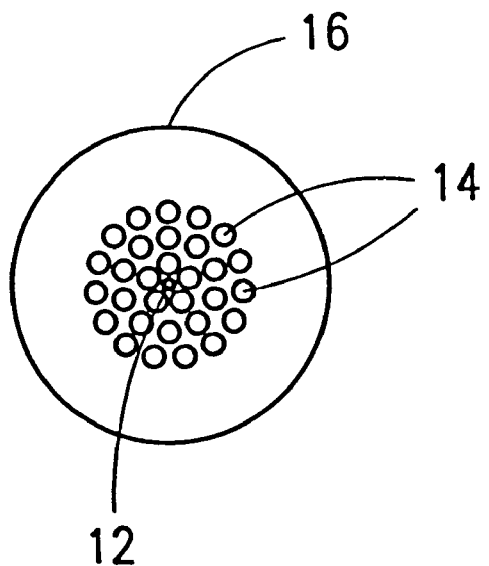
FIG. 2 shows a cross-section along a line A—A in FIG. 1.

As has already been mentioned, a glass fibre with the highest possible numerical aperture must be used for the receiving glass fibre 14 in order to achieve the highest possible collection efficiency. Rather than just a single receiving glass fibre 14, a bundle with a multiplicity of receiving glass fibres 14 is preferably used, these being arranged around the excitation glass fibre 12 at the end of the common bundle 16, as is shown in FIG. 2. The optical filter 24 (FIG. 1), which is preferably situated in front of the input of the amplifier circuit 26, which may be a photomultiplier, a photodiode or a phototransistor, serves to suppress the excitation light reflected at the one end 12a of the excitation glass fibre 12 so as to prevent this light entering the amplifier circuit 26.

Figure 3:
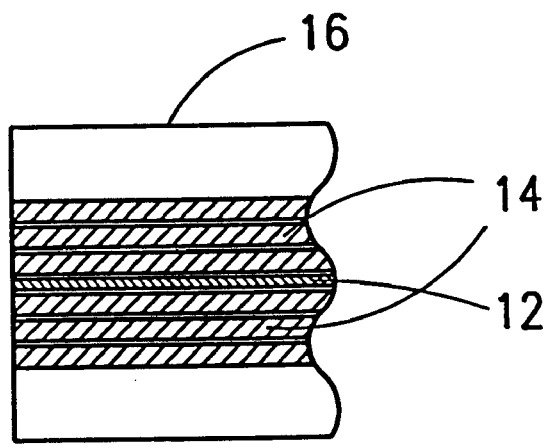
FIG. 3 shows a longitudinal section in the region of the line A—A in FIG. 1.

FIG. 3 shows a longitudinal section through the common bundle 16 in the region of the line A—A in FIG. 1, the essentially concentric arrangement of the single excitation glass fibre 12 within the multiplicity of receiving glass fibres 14 being shown here too.

The end of the common bundle 16, i.e. the one end 12a of the excitation glass fibre 12 and the one end 14a of the receiving glass fibre 14, lies very close to, and is guided over, an storage luminescent substance foil containing the photo-stimulable storage luminescent substance. Since the excitation glass fibre 12 has a low numerical aperture, the storage luminescent substance can be scanned with a high resolution, the photo-stimulated light emitted by the storage luminescent substance being collected with good efficiency due to the high numerical aperture of the at least one receiving glass fibre 14, thus ensuring that the arrangement is sufficiently sensitive. With a monomode fibre having a diameter of 3.7 $\mu$m and an excitation glass fibre aperture angle of 12°, corresponding to a numerical aperture of about 0.2, and at a separation between the one ends 12$a$, 14$a$ and the storage luminescent substance foil of 200 $\mu$m, an excitation spot of about 45 $\mu$m is obtained, corresponding to a resolution of about 11 light points (LP) per mm. The size of this spot, or the resolution, thus depends on the numerical aperture of the excitation glass fibre 12 on the one hand and on the separation between the one end 12$a$ of the excitation glass fibre and the storage luminescent substance on the other.

Figure 4:
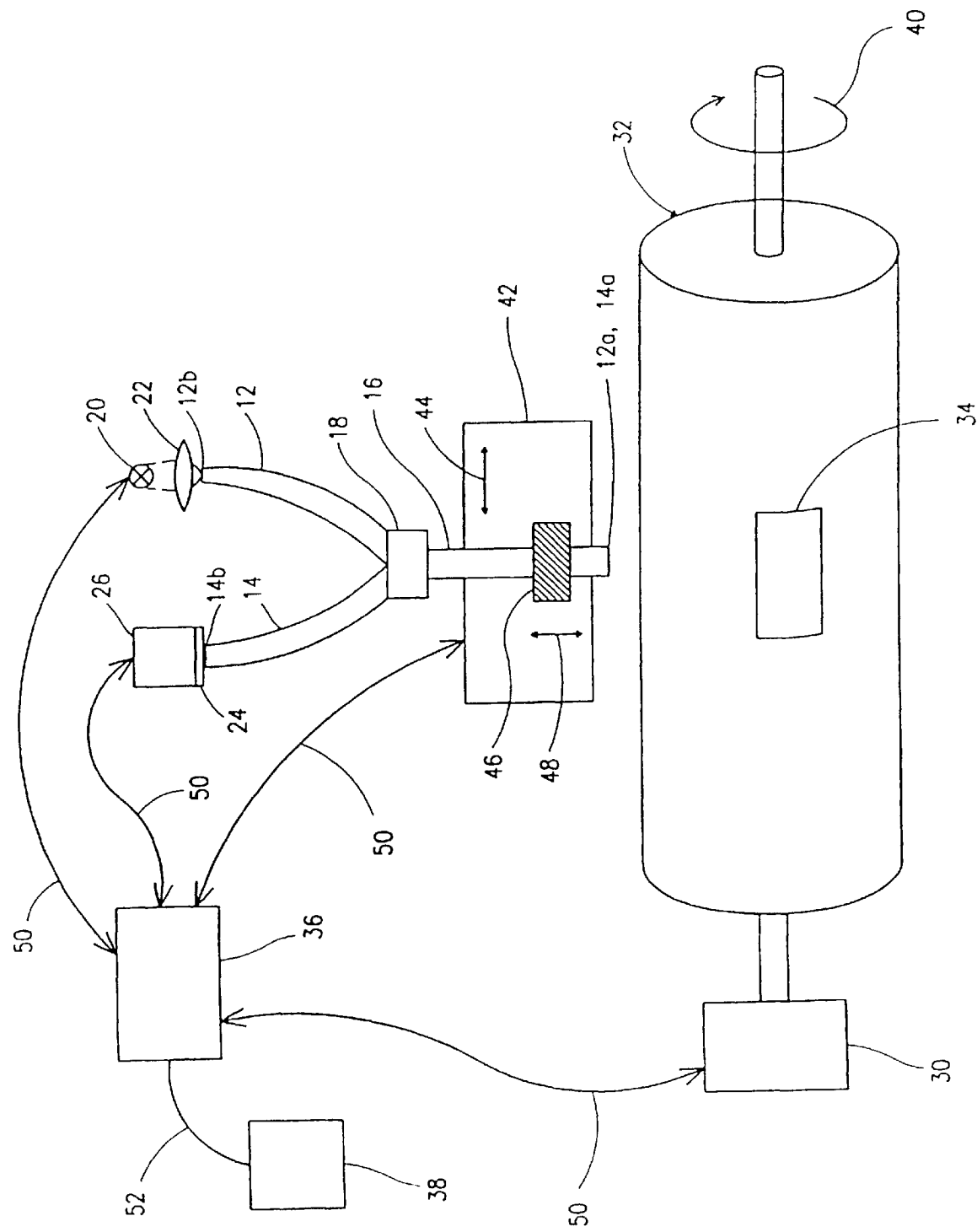
FIG. 4 shows a glass fibre drum scanner according to the present invention.

FIG. 4 shows a preferred embodiment of a glass fibre drum scanner according to the present invention. The components of the glass fibre drum scanner of FIG. 4 which have already been referred to in FIG. 1 are denoted by the same reference numerals and will not be described again hereinafter. The glass fibre drum scanner according to the present invention comprises a rotatable drum 32 driven by a motor 30, it being possible to attach an storage luminescent substance foil to the drum 32. The motor 30 is controlled by a control unit 36, which may e.g. be directed by a personal computer 38 via suitable interfaces. The motor 30 rotates the cylindrical drum 32 about a first axis, as indicated by the rotary arrow 40.

The one end 12$a$ of the excitation glass fibre 12 and the other end 14$a$ of the at least one receiving glass fibre 14, i.e. the end of the common bundle 16 which is oriented towards the surface of the cylindrical drum 32, are passed through an advancing device 42. Advancing preferably takes place along the first axis, as indicated symbolically by the advancing arrow 44. The advancing device 42 is thus able to move the common bundle 16 backwards and forwards over the storage luminescent substance foil 34 after the motor 30 has rotated the drum 32 so that the storage luminescent substance foil 34 of FIG. 4 is positioned under the one ends 12$a$ and 14$a$.

The glass fibre drum scanner according to the present invention, which is shown in FIG. 4, preferably comprises a positioning unit 46 for setting the separation of the end of the common bundle 16 from the surface of the drum 32, i.e. from the storage luminescent substance foil 34. The positioning unit 46 therefore moves the common bundle along a second axis which is perpendicular to the first axis, as is shown by the positioning arrow 48. The separation between the one end 12$a$ of the excitation glass fibre 12 and the storage luminescent substance foil 34 determines the resolution with which the storage luminescent substance foil can be read, as has already been explained above.

Various control lines 50 enable synchronous control of the glass fibre drum scanner by the control unit 36, which makes it possible to achieve coordinated operation of the motor 30, the receiver 26, the light source 20, the advancing device 42 and the positioning unit 46. The control unit in turn is connected via a main control line 52 to a computer, e.g. a personal computer or a workstation.

In a preferred embodiment of the glass fibre drum scanner the motor 30 rotates the drum 32 at a constant speed. At the same time the advancing device 42 moves the common bundle 16 over the storage luminescent substance foil 34, thus achieving a two-dimensional raster scan of the same. The common bundle 16 is thus only moved along the first axis, in conformity with the resolution which can be set by the positioning unit 46, since scanning along the second axis is effected by the rotating drum 32.

The amplifier circuit 26 is preferably triggered in such a way that an image of the storage luminescent substance foil 34 can be recorded. In particular, only those regions of the drum which have previously been set in a program are regarded as valid image data. As is clear from FIG. 4, the whole drum surface does not have to be covered with an storage luminescent substance foil. Storage luminescent substance foils 34 of arbitrary size can be attached to the drum 32. Several foils can also be applied simultaneously. The excitation light of the light source 20 can be controlled in such a way that the light source 20 is switched on when there is a valid data region in front of the one end 12$a$ of the excitation glass fibre. The excitation light will preferably be switched off when there is no valid data region in front of the one end 12$a$. This prevents excitation of the foil by scattered light when the foil finds itself on the rear side of the drum 32 and/or when the one end 12$a$ of the excitation glass fibre 12 is being moved into the read position.

What is claimed is:

1. A glass fibre drum scanner comprising:
 a glass fibre arrangement for reading photo-stimulable storage luminescent substance, comprising:
  an excitation glass fibre for carrying light for exciting the storage luminescent substance; and
  a receiving glass fibre for carrying light produced by an excited storage luminescent substance,
  wherein an end of the excitation glass fibre which is positioned so as to be close to the storage luminescent substance is arranged next to an end of the receiving glass fibre which is positioned so as to be close to the storage luminescent substance,
  wherein the excitation glass fibre has a first numerical aperture,
  wherein the receiving glass fibre has a second numerical aperture which is large compared with the first numerical aperture, and
  wherein the end of the excitation glass fibre is positioned at a predetermined distance to the photo-stimulable storage luminescent substance such that the predetermined distance and the first numerical aperture solely define a spot of exciting light having a spot size defining a resolution for reading information from the photo-stimulable storage luminescent substance;
 an excitation light source which feeds light into another end of the excitation glass fibre;
 a receiver unit for receiving light transmitted in the receiving glass fibre;
 a drum unit rotatable about a first axis and to a curved surface of which the storage luminescent substance is affixed;
 an advancing device for moving the closely arranged ends of the glass fibre arrangement along the first axis, and relative to the drum unit; and
 a control unit for synchronizing operation of the excitation light source, the receiver unit, the drum unit and the advancing device.

2. A glass fibre drum scanner according to claim 1, which furthermore has a positioning unit for positioning the closely arranged ends of the excitation glass fibre and the receiving glass fibre along a second axis, which is perpendicular to the first axis, so as to set a separation of the one ends from the curved surface of the drum.

3. A glass fibre drum scanner according to claim 1, in which the excitation light source is triggerable by the control unit on the basis of previously set data in order that the excitation light source only emits light when a region of the storage luminescent substance which is identified by the preset data is arranged near the one ends of the excitation glass fibre and the receiving glass fibre.

4. A glass fibre drum scanner according to claim 1, in which light produced by the excited storage luminescent substance is collected by the receiving glass fibre, the collection ability of the receiving glass fibre being determined by the second numerical aperture.

\* \* \* \* \*